United States Patent [19]

Flammini

[11] Patent Number: 4,836,723

[45] Date of Patent: Jun. 6, 1989

[54] SPINDLE ASSEMBLY

[76] Inventor: John T. Flammini, 1335 W. Morgan St., Rialto, Calif. 92376

[21] Appl. No.: 785,832

[22] Filed: Oct. 8, 1985

[51] Int. Cl.$^4$ .............................................. B23C 5/26
[52] U.S. Cl. .................................. 409/141; 279/1 Q; 408/143; 408/239 R; 409/233
[58] Field of Search ............ 409/233, 141, 134; 82/DIG. 9; 408/143, 239 R; 279/1 Q, 1 ME

[56] References Cited

U.S. PATENT DOCUMENTS

| | | | |
|---|---|---|---|
| 2,711,904 | 6/1955 | Gartner et al. | 279/1 ME |
| 3,520,228 | 7/1970 | Wohlteil | 409/233 |
| 3,984,192 | 10/1976 | Wanner et al. | 279/1 Q X |
| 4,583,894 | 4/1986 | Mitchell | 409/233 |
| 4,605,349 | 8/1986 | Bone | 409/141 |

OTHER PUBLICATIONS

Metals Handbook, Ninth Ed., vol. 3, pp. 354–356, 12-1983.
"Belleville Springs" catalog, Bearing Engineers, Inc., L.A., CA, p. 3 (undated).
"EX300 Drilling System" flyer, Excellon Automation, Torrance, CA (undated).
"Spindle Technological Advancements", Excellon Automation, Torrance, CA, 6pp (undated).

Primary Examiner—Z. R. Bilnsky
Attorney, Agent, or Firm—Sheldon & Mak

[57] ABSTRACT

An improved high-speed spindle assembly for a shank-driven cutting tool comprises a hollow spindle for a collet, a titanium alloy drawbar within the spindle for threadingly engaging the collet, and a tubular resilient member within the spindle surrounding the drawbar for damping vibrations. A transverse resilient member in a threaded portion of the collet resists rotation of the collet on the drawbar. A ten-tooth involute spline provides precise sliding engagement of the drawbar within the spindle. A pair of ball bearings are axially clamped to the spindle by a pair of titanium nuts, a lower nut having a flange closely spaced from an external annular surface of a spindle housing for excluding foreign matter, an upper nut having a cavity for axially retaining a flange of the drawbar.

22 Claims, 2 Drawing Sheets

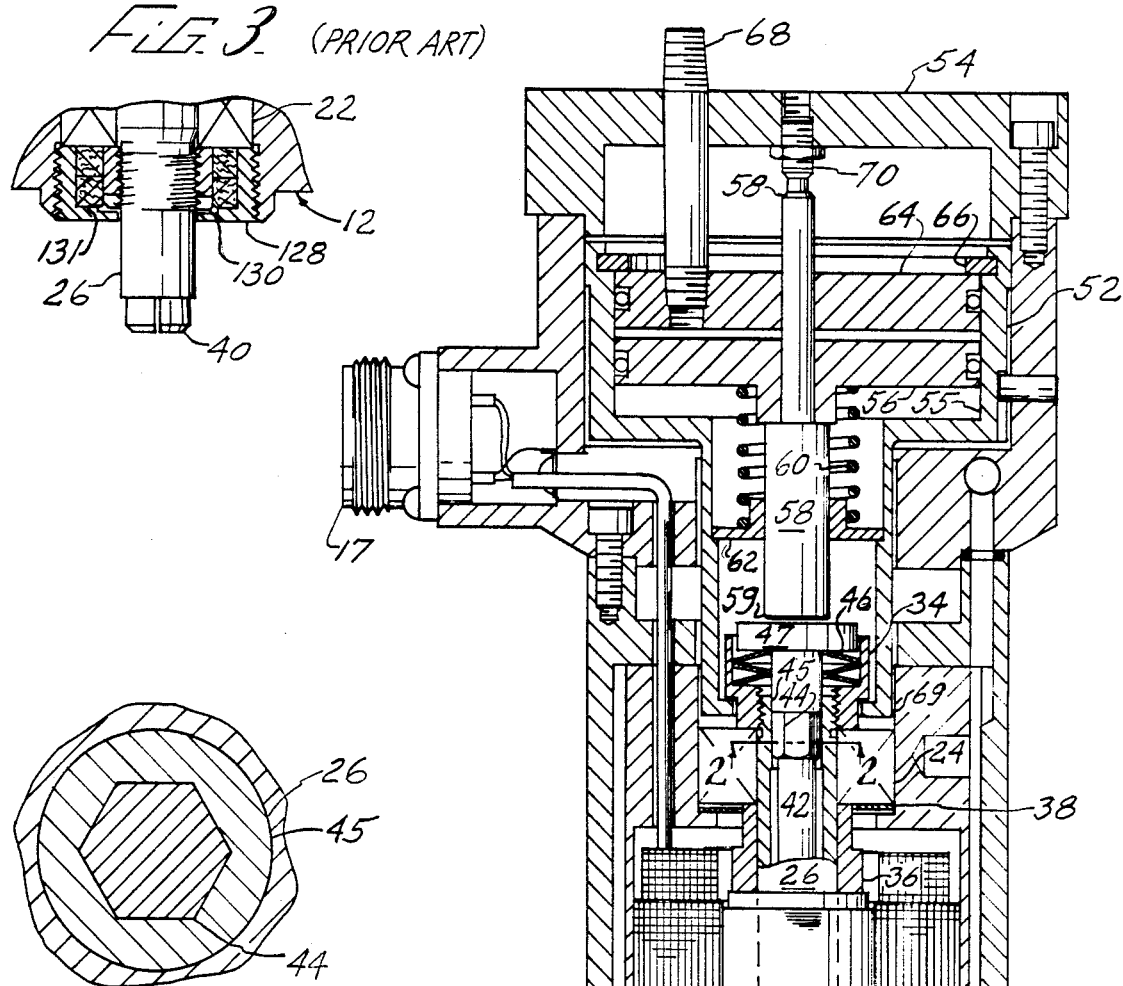
Fig. 3 (PRIOR ART)
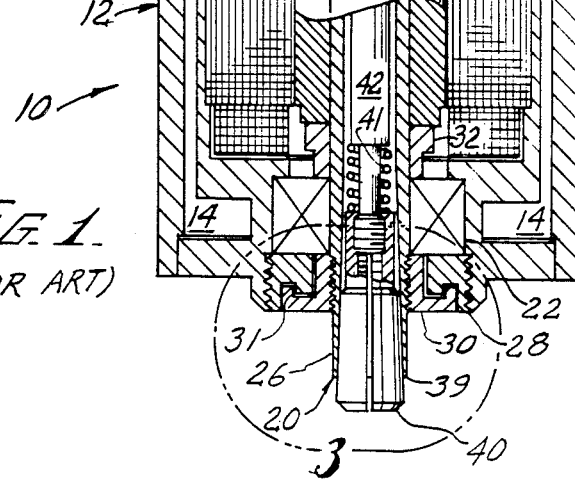
Fig. 2 (PRIOR ART)
Fig. 1 (PRIOR ART)

SPINDLE ASSEMBLY

BACKGROUND

The present invention relates to machine spindles and more particularly to high-speed drilling and routing spindles for fabricating printed circuit boards.

The production of printed circuit boards requires drilling large numbers of small-diameter holes in sheets of glass-reinforced epoxy and the like. The outside contours or edges of the boards are typically produced by routing. In order to obtain clean hole and edge geometry and high production rates, very high-speed rotation of the drill bits and/or routing cutters is required.

A numerically controlled circuit board drilling/routing machine is manufactured by Excellon Automation of Torrance, California. The machine includes a plurality of high speed spindle units, each unit of a typical model having a 1 horsepower, 60,000 rpm motor and a pneumatically operated collet mechanism for automatic exchange of drill bits and/or routing cutters. These spindle units are mounted vertically in a common frame above corresponding stacks of blank boards, the frame being capable of rapid raising and lowering for feeding the drill bits. An electronic control for the motors provides three-phase synchronous speed control and quick starting and stopping of the spindles. The machine provides automatic tool changes by (1) halting spindle rotation and positioning a tool receptacle under the collet; (2) opening the collet for releasing a first tool; (3) inserting a second tool in the collet; (4) closing the collet; and (5) resuming rotation of the spindle.

The spindle units of these machines exhibit a number of problems, including one or more of the following:

1. The collet mechanism has lateral play, causing the spindle to be unbalanced. When tool bits are changed, the mechanism can shift laterally, so that even if the spindle was balanced initially, it goes out of balance. This condition is greatly exaggerated when the collet is changed, so that severe damage results from inadvertent operation of the spindle without a collet.

2. The spindle is subject to harmonic resonance, especially at certain speeds and when subjected to lateral loads in routing operations. The associated resonant vibrations produce excessive wear of the spindle bearings and collet mechanism, contributing to an unbalanced condition of the spindle.

3. The collet mechanism incorporates a drawbar having a male hexagonal member slidingly engaging a corresponding female portion of the spindle shaft for preventing rotation of the drawbar with respect to the shaft. The engagement surfaces are subject to excessive wear because the high pressure angle of engagement, about 60°, produces very high compressive stresses at the points of engagement.

4. A compression spring is used between the collet and an actuating drawbar of the collet mechanism for preventing rotational adjustment of the collet when changing tool bits. The spring chatters in the routing mode, eroding away the drawbar and causing it to break.

5. The drawbar is biased axially by a plurality of belleville washers, the washers being located radially within a thin cylindrical cup fastened to the spindle shaft. The clearance between a cup that is required for expansion of the washers under axial compression permits the washers to shift radially, contacting one side of the cup and creating an unbalanced condition. When the washers are subsequently compressed for releasing the collet, they dig into the cup, deforming it. After repeated tool changes, there is substantial deformation of the cup, worsening the unbalanced condition of the spindle.

6. Rapid vertical movement of the frame produces axial movement of the drawbar within the spindle, especially when there is no tool in the collet, and when the collet is removed, resulting in harmful contact between the drawbar and a non-rotating actuating plunger. If the spindle is rotating when this happens, the result is destructive wear of the drawbar and the plunger.

7. The spindle bearings are axially preloaded by a wavy spring washer. The rapid vertical movement of the spindle and/or axial shocks associated with operation of the collet mechanism cause this washer to collapse and become permanently deformed. Thus the desired preloading is lost.

8. It is impractical to balance the spindle shaft together with its bearings and associated parts. Thus the shaft, with its armature laminations alone are balanced. The associated parts, including clamp nuts for the bearings are often significantly out of balance in spite of being machined precisely concentric because the steel alloys used in these parts have uneven density.

9. The machine is not reliably interlocked to prevent the independent operation of the spindle units without the cutting tool and/or collet in place.

10. Fiberglas drillings and dust particles get into the spindle housing through a labyrinth seal, eroding the seal and damaging the lower bearing of the spindle.

A large number of these machines are in use, involving great expenditures of money in the repair and replacement of the prematurely failing spindle units. Thus there is a need for a high-speed spindle assembly for drilling and/or routing printed circuit boards that avoids the above problems and is easy and inexpensive to produce. In addition, there is a need for a method for correspondingly improving existing spindle units.

SUMMARY

The improved high-speed spindle assembly of the present invention meets these needs by incorporating a resiliently guided collet mechanism for preserving a balanced condition of the spindle during operation of the collet and for damping harmful vibrations. The spindle assembly comprises a housing; a hollow spindle shaft journaled in the housing for receiving a collet in a first end thereof; a drawbar for operating the collet extending within the shaft and slidingly engaging a second end of the shaft; means for driving the shaft for rotating the tool; and a strain-energy absorbing tubular member within the shaft for centering the drawbar and damping vibrations of the shaft and of the drawbar.

Preferably the tubular member is compressed within the shaft. In the compressed state, the tubular member provides improved dimensional stability and greater damping effectiveness. Preferably the resilient member is lined with a rigid tubular sleeve for facilitating assembly while maintaining the radial compresson of the resilient member.

Preferably the drawbar is splined for engaging at least three teeth of corresponding female splines at the second end of the shaft, the splines having a pressure angle of not more than about 45° for avoiding excessive wear between the drawbar and the shaft. Preferably the splines have a pressure angle of not more than 30° and an involute profile for providing low force concentrations and ease of manufacture.

Preferably the shaft rotates on a pair of ball bearings that are preloaded by a conical spring washer having continuous contact around a race of one of the bearings. The spring washer compensates for axial tolerances and thermal expansion of the spindle assembly without introducing distortion and/or uneven loading of the bearing race that would otherwise be caused by a wavy washer, and without collapsing when the collet is opened or when the housing is subjected to axial acceleration.

Preferably the shaft has a flange member extending proximate to the first end of the shaft in a closely spaced relation to an external face of the housing for excluding foreign material from inside the housing. Preferably the flange member is spaced from about 0.001 inch to about 0.002 inch from the external annular surface.

Preferably the drawbar is axially biased by a conical spring washer, the washer being radially aligned by engagement with a shank portion of the drawbar.

Preferably the drawbar is retained axially within the shaft by means of a cup member, the cup member comprising a cavity for clearing a flange portion of the drawbar, a ring portion for preventing axial movement of the flange more than a pre-determined distance away from the first end of the shaft, and biasing means permitting expansion of the ring for entry of the flange into the cavity during assembly of the spindle.

Preferably each of the ball bearings is axially clamped to the shaft by corresponding threaded nuts, each of the threaded nuts being fabricated of titanium having uniform density for providing that the nuts are precisely balanced by means of concentric machining operations, without the need for a subsequent balancing operation. The threaded nuts can be "commercially pure" titanium having a purity of approximately 99.5%.

Preferably the drawbar is made from a high-strength titanium alloy for providing sufficient strength to reliably operate the collet in a member that is extremely lightweight for avoiding imbalance of the spindle during operation of the collet and for reducing wear and vibration of the drawbar. Preferably a threaded portion of the drawbar engages the collet, a resilient member protruding the threaded portion transversly for resisting rotation of the collet with respect to the drawbar. The resilient member resists rotation of the collet without subjecting the drawbar to erosion in the presence of vibration. Also, the resilient member does not produce an unbalanced condition of the spindle.

The means for driving the shaft can be a field-winding fixed in the housing and an armature element fixed to the shaft. Thus, the spindle assembly functions has an electric motor.

The present invention provides a method for improving a high-speed spindle assembly for a shank-driven cutting tool, the assembly having a housing, a first hollow spindle shaft rotatably mounted in the housing, a first end of the shaft being adapted to receive a collet for holding the cutting tool, a first drawbar extending within the shaft for engaging the collet and slidingly engaging a second end of the shaft, means for biasing the drawbar toward the second end of the shaft, and means for driving the shaft for rotating the tool, the method comprising the steps of:

(a) removing and discarding the first spindle shaft along with the first drawbar;

(b) providing a second drawbar comprising a male splined member having a least three teeth;

(c) providing a second shaft comprising a first end for receiving the collet and a female splined member at a second end thereof for engaging the male splined member at a pressure angle of about 45° or less;

(d) inserting the second drawbar into splined engagement with the second shaft; and (e) inserting the second shaft into the housing.

Preferably the method includes the additional step of affixing a tubular strain-energy absorbing member to the inside of the second shaft enclosing a portion of the second drawbar for centering the drawbar and damping vibrations of the shaft and of the drawbar. Preferably the method includes the further steps of:

(a) radially compressing the strain-energy absorbing material;

(b) following the step of inserting the tubular member, reducing the temperature of the tubular member for temporarily hardening the tubular member;

(c) machining the tubular member to a desired inside diameter; and (d) while the tubular member remains at a reduced temperature and temporarily hardened, affixing a rigid sleeve to the inside diameter of the tubular member.

The present invention provides a high-speed spindle assembly that is easy to balance and remains balanced during opening and closing as the collet, as well as when the collet is removed. The assembly is resistant to harmonic resonance as well as chattering during routing operations.

The spindle assembly is not subject to destructive axial movement of the drawbar, even when the housing is subjected to high axial accelerations during operation.

DRAWINGS

These and other features, aspects, and advantages of the present invention will become better understood with reference to the following description, appended claims, and accompanying drawings where:

FIG. 1 is a longitudinal sectional elevational view of a prior art drilling/routing spindle;

FIG. 2 is a fragmentary lateral sectional view of the spindle of FIG. 1 taken along line 2—2 in FIG. 1;

FIG. 3 is a fragmentary sectional elevational view of an alternate configuration of the prior art spindle of FIG. 1 within region 3 of FIG. 1;

DESCRIPTION

Figures 4, 5:
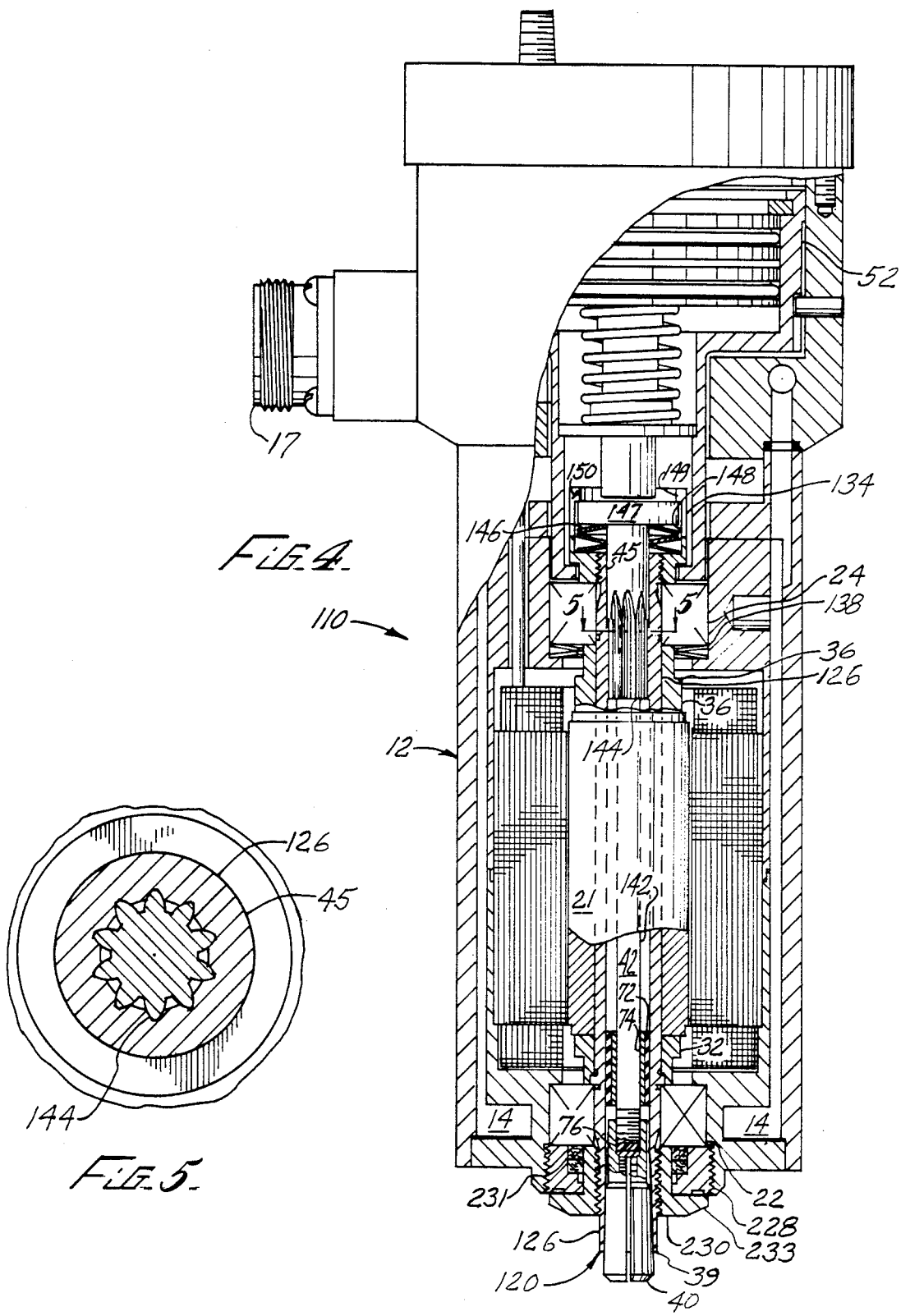
FIG. 4 is a longitudinal sectional elevational view of a drilling/routing spindle according to the present invention.
FIG. 5 is a fragmentary lateral sectional view of the spindle of FIG. 1 taken along line 5—5 in FIG. 4.

With reference to FIGS. 1-2, an existing spindle assembly 10 comprises a housing assembly 12 having a coolant cavity 14. A field member 16 is mounted within the housing assembly 12 and electrically wired to a connector 17 for excitation by external means (not shown).

An armature assembly 20, including an armature element 21, is rotatably mounted within the housing assembly 12 on a pair of ball bearings, a lower bearing 22 and an upper bearing 24, a spindle shaft 26 of the armature assembly 20 protruding the respective bearings 22 and 24. The lower bearing 22 is clamped axially within the housing assembly 12 by a housing nut 28. The lower bearing 22 is also axially clamped to the spindle shaft 26 against a lower ring 32 by a lower nut 30. The housing nut 28 and the lower nut 30 are interlocked to form a labyrinth 31 for excluding foreign matter from the housing assembly 12.

The upper bearing 24 is axially clamped to the spindle shaft 26 against an upper ring 36 by an upper nut 34, the bearings being axially preloaded by a bearing spring 38 in the form of a wavy washer interposed between one side of the upper bearing 24 and the housing assembly 12.

The spindle shaft 26 is hollow, a first end 39 thereof being tapered internally for receiving a collet 40. A drawbar 42 extends axially through the spindle shaft 26, the drawbar 42 threadingly engaging the collet 40, a hexagonal portion 44 of the drawbar 42 slidingly engaging a second end 45 of the spindle shaft 26. The engagement of the hexagonal portion 44 of the drawbar 42 with the second end 45 of the spindle shaft 26 prevents rotation of the drawbar 42 with respect to the spindle shaft 26. Thus rotation of the collet 40 with respect to the spindle shaft 26 causes the threaded engagement of the drawbar 42 with the collet 40 to produce an adjustment for the closed condition of the collet. A helical compression collet spring 41 engages the collet 40 and the drawbar 42 for preventing undesired rotation of the collet 40 when the collet 40 is in a released condition.

Three belleville washers of drawbar springs 46 are interposed between the upper nut 34 and a flange member 47 of the drawbar 42 for biasing the drawbar 42 away from the first end 39 of the spindle shaft 26. The drawbar springs 46 are radially confined within a cup member 48 of the upper nut 34. Thus tension is applied to the drawbar 42 by the drawbar springs 46 for closing the collet on the shank of a tool bit (not shown).

The existing spindle assembly 10 includes an actuator assembly 52 for releasing the collet 40. The actuator assembly 52 is loosely confined within the housing assembly 12 and retained therein by a cap 54.

The actuator assembly 52 comprises a cylindrical body 55, a piston 56 slideably moveable therein, and a plunger 58, the plunger 58 fixably protruding the piston 56, a first end 59 thereof extending proximate to the flange member 47 of the drawbar 42. The piston 56 is biased axially away from the drawbar 42 by a piston spring 60, the piston spring 60 being fixably retained within the body 55 by a spring flange 62. A head 64, sealingly engaging the body 25, is retained therein by a retainer 66. A nipple 68 is fastened to the head 64 for directing fluid pressure between the piston 56 and the head 64, the nipple slidingly protruding the cap 54 for connection to an external source of fluid pressure (not shown).

When fluid pressure is directed into the nipple 68, the piston 56 and the head 64 move apart, the first end 59 of the plunger 58 bearing against the flange member 47 of the drawbar 42. A claw member 69 of the body 55 then moves into engagement with the upper nut 34 for preventing a reaction force from the plunger 58 from being transmitted into the bearings 22 and 24 of the armature assembly 20. Some reaction force is temporarily transmitted, however, because of the inertia of the parts and axial clearance that must necessarily be provided.

An adjustable stop 70 is fastened to the cap 54 for engaging a second end 71 of the plunger 58 for adjusting the clearance between the first end 59 of the plunger 58 and the drawer 42 when the fluid pressure is released.

In another version of the existing spindle assembly, shown in FIG. 3, the lower bearing 22 is axially clamped to the housing assembly 12 by a housing nut 128. The lower bearing 22 is also clamped to the spindle shaft 26 by a lower nut 130, the lower nut 130 being enclosed within the housing nut 128. A pair of felt rings 131 occupy an annular space between the housing nut 128 and the lower nut 130 for excluding foreign particles from the lower bearing 22.

With reference to FIGS. 4 and 5, the present invention is directed to an improved spindle assembly 110. Portions of the improved spindle assembly 110 that are unchanged from the existing spindle assembly 10 are designated identically in the drawings.

The improved spindle assembly 110 comprises the housing assembly 12 and an armature assembly 120, the armature assembly 120, including the armature element 21, being rotatably mounted within the housing assembly 12 on the lower bearing 22 and the upper bearing 24, a spindle shaft 126 of the armature assembly 120 protruding the respective bearings 22 and 24. The lower bearing 22 is clamped axially within the housing assembly 12 by a housing nut 228. The lower bearing 22 is also axially clamped to the spindle shaft 126 against the lower ring 32 by a lower nut 230. A flange member 233 of the lower nut 230 extends external to the housing assembly 12 in a closely spaced relation in parallel with a facing surface of the housing nut 228 for excluding glass particles and other foreign materials from the housing assembly 12. High-speed rotation of the flange member 233 tends to direct the foreign particles outwardly, away from the space between the flange member 233 and housing nut 228. The flange member 233 also shields the space between the flange member and the housing nut 228 from direct bombardment by fiberglas and other abrasive particles flying up from the tool bit.

The space between the flange member 233 and the housing nut 228 is between approximately 0.0005 inch and approximately 0.005 inch wide. Prefereably the space is between about 0.001 inch and about 0.003 inch wide. More preferably, the space is between about 0.001 inch and about 0.002 inch wide. It is important that the housing assembly 12 does not obstruct the radial movement of the particles outwardly from the flange member 233. A pair of felt rings 231 is also provided within the housing nut 228, the felt rings 231 slidingly engaging the lower nut 34 for providing additional protection against the entry of foreign matter into the housing assembly 12.

The upper bearing 24 is axially clamped to the spindle shaft 126 against the upper ring 34 by an upper nut 134, the bearings being axially preloaded by a pair of bearing springs 138 interposed between one side of the upper bearing 24 and housing assembly 12. The bearing springs 138 are back-to-back conical spring washers, one of the bearing springs 138 providing uninterrupted contact with the side of the upper bearing 24. Thus the upper bearing 24 is not unevenly loaded by localized contact with the wavy bearing spring 38. Additionally, the bearing springs 138 are not subject to permanent deformation during operation of the actuator assembly 52 or axial acceleration of the housing assembly 12.

The spindle shaft 126 is hollow, a first end 39 thereof being tapered internally for receiving a collet 40. A drawbar 142 extends axially through the spindle shaft 126, the drawbar 142 threadingly engaging the collet 40, a splined portion 144 of the drawbar 142 slidingly engaging a second end 45 of the spindle shaft 126.

The splined portion 144 has ten teeth of 40/80 diametral pitch, 30° pressure angle involute profile for conveniently providing precise sliding engagement with the spindle shaft 126. The combination of ten teeth and 30° pressure angle profile effectively provides precise positioning of the drawbar 142 with low contact force concentrations, and without excessive radial and angular clearance. The 30° pressure angle profile compares favorably with a 60° pressure angle that is associated with the hexangonal portion 44 of the drawbar 42 of the existing spindle 10.

Alternately, the splined portion 144 can have pure radial contact (zero pressure angle). Additionally, other tooth forms of the splined portion 144 are posible, as long as the pressure angle is not more than about 45° for assuring low contact forces.

Preferably the splined portion 144 comprises at least three teeth in engagement with the shaft 126 for precisely centering the drawbar 144.

Three conical spring washers or drawbar springs 146 are interposed between the upper nut 134 and a flange member 147 of the drawbar 142 for biasing the drawbar 142 away from the first end 39 of the spindle shaft 126. The drawbar springs 146 are radially confined on the drawbar 142 with a radial clearance of about 0.001 inch to about 0.002 inch for maintaining the drawbar springs 146 concentric with the drawbar 142. Thus tension is applied to the drawbar 142 by the drawbar springs 146 for closing the collet on the shank of a tool bit (not shown).

The flange member 147 of the drawbar 142 is confined within a cup member 148 of the upper nut 134, the cup member 148 having a ring member 149 for preventing axial movement of the flange member 147 of the drawbar 142 from moving more than a predetermined distance away from the first end 39 of the spindle shaft 126. A plurality slots 150 extend into the cup member 148 for permitting expansion of the ring member 149, permitting the flange member 147 of the drawbar 142 to be inserted within the cup member 148.

A tube 72 is fixed to the inside of the shaft 126 proximate to the collet 40 for centering the drawbar 142 during an exchange of the collet 40. The tube 72 comprises neoprene rubber, a strain-energy absorbing material, for damping mechanical vibrations of the shaft 126 and the drawbar 144.

The tube 72 is preferably in a compressed state for enchanced dimensional stability and damping effectiveness. The compressed state of the tube 72 is provided by radially compressing an oversized solid rod of the neoprene and pressing the rod into the shaft and freezing the neoprene at a temperature of below zero degrees Farenheit, drilling the neoprene, then, while the neoprene remains below about 32° F., cemeting a rigid sleeve 74 in place as a lining inside the tube 72 for preserving the compressed state of the neoprene at room temperature. The sleeve 74 has an inside diameter providing a close sliding fit over the drawbar 142.

The drawbar 142 is provided with a transverse nylon insert 76 for compressive threaded engagement with opposite sides of the collet 40. The nylon insert 76, being resilient, resists rotation of the collet 40 on the drawbar 142 for preventing unwanted changes in the adjustment of the collet 40. Thus, the collet spring 41 is eliminated in the improved spindle assembly 110.

The drawbar 142 comprises a high-strength alloy of titanium with about 6% aluminum and 4% vanadium for high strength and abrasion resistance, and very low weight. The very low weight of the drawbar 142 makes the balancing of the armature assembly 120 relatively insensitive to a slight eccentricity of the drawbar 142 that can be present even with the precise centering by the spline member 144 and the tube 72.

The lower nut 230 and the upper nut 134 are fabricated from commercially pure (99.5%) titanium for convenient balancing by the simple expedient of concentric machining of the individual nuts and corresponding threaded portions of the shaft 126. This is because the titanium is both light in weight and uniform in density. Thus once the shaft 126 with the armature element 21, the lower ring 32, and the upper ring 32 is dynamically balanced, the other parts can be assembled without undesirably creating an unbalanced condition. The titanium material of the lower nut 230 is also advantageously very resistant to erosion by the fiberglas and other material flying up from the tool bit.

The improved spindle assembly 110 of the present invention advantageously incorporates the housing assembly 12 of the existing spindle assembly 10, permitting low-cost conversion of the existing spindle assembly 10 to the improved spindle assembly 110. Thus the armature assembly 20 (including the lower nut 30, the upper nut 34, and the drawger 42), the housing nut 28, and the bearing spring 38 of the existing spindle assembly 10 are replaced in the improved spindle assembly 110 by the armature assembly 20 (including the lower nut 230, the upper nut 134, and the drawbar 142), the housing nut 228, and the pair of bearing springs 138.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. A high-speed spindle assembly for a shankdriven cutting tool comprising:
   (a) a housing:
   (b) a hollow spindle shaft rotatably mounted in the housing, a first end of the shaft being adapted to receive a collet for holding the cutting tool;
   (c) a drawbar extending within the shaft for engaging the collet and slidingly engaging a second end of the shaft, the drawbar being operable for opening and closing the collet;
   (d) means for driving the shaft for rotating the tool; and
   (e) a tubular member comprising a strain-energy absorbing material, the tubular member engaging to the inside of the shaft and the outside of the drawbar for centering the drawbar within the shaft and for damping vibrations of the shaft and of the drawbar.

2. The assembly of claim 1 wherein the strain energy absorbing material of the tubular member is in radial compression within the shaft.

3. The assembly of claim 1 wherein the stain-energy absorbing material of the tubular member is rigidly joined to one of the shaft and the drawbar, the tubular member further comprising a rigid sleeve fastened to the strain-energy absorbing material and slidingly engaging the other of the shaft and the drawbar for facilitating manufacture of the spindle assembly.

4. The assembly of claim 3 wherein the strain-energy absorbing material of the tubular member is in radial compression between the rigid sleeve and one of the shaft and the drawbar.

5. The assembly of claim 3 wherein the strain-energy absorbing material of the tubular member is attached to the shaft and the rigid sleeve slidingly engages the drawbar.

6. The assembly of claim 1 wherein the first end of the shaft is adapted for receiving a plurality of interchangeable collets, the assembly including a primary means for centering the drawbar within the shaft comprising coaxial engagement of the drawbar with the collet in a closed condition of the collet, and the centering of the drawbar within the shaft by the tubular member functions as a secondary means for centering the drawbar that is primarily operative for centering when the collet is not in the closed condition.

7. The assembly of claim 6 wherein a threaded portion of the drawbar engages the collet, the threaded portion having a resilient member extending transversely therethrough for resisting rotation of the collet with respect to the drawbar.

8. The assembly of claim 6 wherein the primary means for centering the drawbar within the shaft further comprises the drawbar coaxially engaging the second end of the shaft.

9. The assembly of claim 1 wherein the tubular member is located proximate the first end of the shaft.

10. A highspeed spindle assembly for a shank-driven cutting tool comprising:
    (a) a housing;
    (b) a hollow spindle shaft rotatably mounted in the housing, a first end of the shaft being adapted to receive a collet for holding the cutting tool;
    (c) a drawbar extending within the shaft for engaging the collet and slidingly engaging a second end of the shaft, the drawbar being operable for opening and closing the collet; and
    (d) means for driving the shaft for rotating the tool, wherein the housing includes an external face member proximate the first end of the shaft and the shaft includes a flange member extending parallel in a closely spaced relation to the external face member for excluding foreign material from inside the housing.

11. The assembly of claim 10 in which the flange member is spaced from about 0.001 inch to about 0.002 inch from the external annular surface.

12. A highspeed spindle assembly for a shank-driven cutting tool comprising:
    (a) a housing;
    (b) a hollow spindle shaft rotatably mounted in the housing, a first end of the shaft being adapted to receive a collet for holding the cutting tool;
    (c) a drawbar extending within the shaft for engaging the collet and slidingly engaging a second end of the shaft, the drawbar being axially operable by a non-rotating member for opening and closing the collet;
    (d) means for driving the shaft, together with the drawbar, for rotating the tool; and
    (e) a cup member on the second end of the shaft for axially retaining the drawbar within the shaft, the cup member comprising:
        (i) a cavity providing clearance for a flange member of the drawbar;
        (ii) a ring portion for preventing axial movement of the flange member beyond a predetermined distance in a direction away from the first end of the shaft; and
        (iii) biasing means for permitting expansion of the ring portion for entry of the flange member into the cavity.

13. A highspeed spindle assembly for a shank-driven cutting tool comprising:
    (a) a housing;
    (b) a hollow spindle shaft rotatably mounted in the housing, a first end of the shaft being adapted to receive a collet for holding the cutting tool;
    (c) a drawbar extending within the shaft for engaging the collet and slidingly engaging a second end of the shaft, the drawbar being operable for opening and closing the collet; and
    (d) means for driving the shaft for rotating the tool, wherein the rotatable mounting of the shaft includes a pair of ball bearings, an inner race of each bearing being axially clamped to the shaft by a corresponding threaded nut, each of the threaded nuts being fabricated of titanium having uniform density.

14. The assembly of claim 13 in which the threaded nuts comprise commercially pure titanium having a purity of approximately 99.5%.

15. A high-speed spindle assembly for a shank-driven cutting tool comprising:
    (a) a housing;
    (b) a hollow spindle shaft rotatably mounted in the housing, a first end of the shaft being adapted to receive a collet for holding the cutting tool;
    (c) a drawbar extending within the shaft for engaging the collet and slidingly engaging a second end of the shaft, the drawbar being operable for opening and closing the collet; and
    (d) means for driving the shaft for rotating the tool, wherein the drawbar comprises a high-strength titanium alloy.

16. A high-speed spindle assembly for a shankdriven cutting tool comprising:
    (a) a housing;
    (b) a tubular spindle shaft rotatably mounted in the housing, a first end of the shaft being adapted to receive a collet for holding the cutting tool;
    (c) a drawbar extending within the shaft for opening and closing the collet, the drawbar including a male splined member having at least three teeth for coaxially engaging a corresponding female spline member of the shaft proximate the second end of the shaft, the splines engaging at a pressure angle not more than about 45° for avoiding excessive wear between the drawbar and the shaft; and
    (d) means for driving the shaft for rotating the tool.

17. The assembly of claim 16 in which the splines have an involute tooth profile.

18. The assembly of claim 16 wherein the means for driving the shaft comprises a field winding fixed within the housing and an armature member fixed to the shaft.

19. The assembly of claim 16 in which the splines engage at a pressure angle of not more than about 30°.

20. The assembly of claim 19 wherein the male splined member of the drawbar has at least ten teeth.

21. A high-speed spindle assembly for a shank-driven cutting tool comprising:
    (a) a housing;
    (b) a tubular spindle shaft rotatably mounted in the housing on a pair of ball bearings, the bearings being axially preloaded by a first conical spring washer having continuous contact around a race of one of the bearings, the bearings being axially clamped to the shaft by corresponding threaded nuts, the nuts comprising uniformly dense titanium, a first end of the shaft being adapted to receive a collet for holding the cutting tool;

(c) a drawbar extending within the shaft for operating the collet, the drawbar including a male splined member having at least three teeth for engaging a corresponding female spline member of the shaft proximate the second end of the shaft, the splines engaging at a pressure angle of not more than about 30° for avoiding excessive wear between the drawbar and the shaft;

(d) a second conical spring washer for biasing the drawbar toward the second end of the shaft for closing the collet, the second washer axially engaging a flange member on the drawbar, the second washer being radially aligned by engagement with a shank portion of the drawbar;

(e) means for driving the shaft for rotating the tool;

(f) an external face member on the housing;

(g) a flange member on the shaft extending in close parallel proximity to the external face member for excluding foreign material from inside the housing;

(h) a cup member on the second end of the shaft for axially retaining the drawbar within the shaft, the cup member comprising:
(i) a cavity providing clearance for the flange member of the drawbar;
(ii) a ring portion for preventing axial movement of the flange member beyond a predetermined distance in a direction away from the first end of the shaft; and
(iii) biasing means for permitting expansion of the ring portion for entry of the flange member into the cavity;

(f) a tubular member affixed to the inside of the shaft and enclosing a portion of the drawbar for centering the drawbar within the shaft and for damping vibrations of the shaft and of the drawbar, the tubular member comprising a strain-energy absorbing material; and (g) a rigid sleeve fastened to the inside of the tubular member for lining the tubular member.

22. A high-speed spindle assembly comprising:

(a) a housing;

(b) a hollow spindle shaft rotatably mounted in the housing, a first end of the shaft being adapted to receive a collet for holding a cylindrical member;

(c) a bar member extending within the shaft for engaging the collet and movably coaxially engaging a second end of the shaft, the bar member being operable between first and second positions relative to the shaft for respectively opening and closing the collet;

(d) means for driving the shaft for rotating the tool; and (e) means for centering the bar member within the shaft proximate the first end of the shaft, comprising:
(i) a flexible member connected between the bar member and the shaft proximate the collet; and
(ii) engagement of the bar member with the collet;

wherein the engagement of the bar member with the collet is a primary means for centering the bar member when the bar member is in the second position, the flexible member functioning as a secondary means for centering; and the flexible member is a primary means for centering the bar member when the bar member is not in the first position engaging the collet.

* * * * *